US008481167B2

(12) United States Patent
Watanabe et al.

(10) Patent No.: US 8,481,167 B2
(45) Date of Patent: Jul. 9, 2013

(54) CHARGING MEMBER

(75) Inventors: Hiroaki Watanabe, Odawara (JP); Masaaki Harada, Yokohama (JP); Keiji Nose, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 13/416,901

(22) Filed: Mar. 9, 2012

(65) Prior Publication Data

US 2012/0177408 A1 Jul. 12, 2012

Related U.S. Application Data

(63) Continuation of application No. PCT/JP2011/006243, filed on Nov. 8, 2011.

(30) Foreign Application Priority Data

Nov. 11, 2010 (JP) ................................ 2010-252920

(51) Int. Cl.
*B32B 27/00* (2006.01)
*G03G 15/02* (2006.01)

(52) U.S. Cl.
USPC .......................................... 428/500; 399/176

(58) Field of Classification Search
None
See application file for complete search history.

(56) References Cited

U.S. PATENT DOCUMENTS

| | | | | |
|---|---|---|---|---|
| 6,042,946 | A | 3/2000 | Massie, II et al. | |
| 6,078,778 | A | 6/2000 | Murata et al. | |
| 7,486,911 | B2 | 2/2009 | Harada | |
| 8,440,307 | B2 * | 5/2013 | Nose et al. | 428/421 |
| 2011/0176833 | A1 | 7/2011 | Harada et al. | |
| 2012/0045250 | A1 | 2/2012 | Harada et al. | |
| 2012/0076539 | A1 | 3/2012 | Sato et al. | |
| 2012/0082852 | A1 | 4/2012 | Nose et al. | |
| 2012/0141161 | A1 | 6/2012 | Watanabe et al. | |

FOREIGN PATENT DOCUMENTS

| | | | |
|---|---|---|---|
| JP | 9-114189 | A | 5/1997 |
| JP | 9-194636 | A | 7/1997 |
| JP | 11-84819 | A | 3/1999 |
| JP | 11-149201 | A | 6/1999 |
| JP | 11-311890 | A | 11/1999 |
| JP | 2002-521725 | A | 7/2002 |
| JP | 2002-226711 | A | 8/2002 |
| JP | 2007-52070 | A | 3/2007 |
| JP | 2007-163849 | A | 6/2007 |

OTHER PUBLICATIONS

PCT International Search Report and Written Opinion of the International Searching Authority, International Application No. PCT/JP2011/006243, Mailing Date Dec. 6, 2011.
International Search Report dated Dec. 6, 2011 in International Application No. PCT/JP2011/006243.
Harada, et al., U.S. Appl. No. 13/471,338, filed May 14, 2012.

* cited by examiner

*Primary Examiner* — Sheeba Ahmed
(74) *Attorney, Agent, or Firm* — Fitzpatirck, Cella, Harper & Scinto

(57) ABSTRACT

Provided is a charging member having an elastic layer to which components derived from a developer hardly adhere even when the charging member is used for a long time period and in which elastic layer the occurrence of compression set is suppressed The charging member includes: a electroconductive support; and a electroconductive elastic layer, in which the elastic layer is formed through irradiation of an electron beam onto a surface of a rubber layer formed of a crosslinked product of a rubber mixture containing an acrylonitrile-butadiene rubber and a styrene-butadiene rubber; the styrene-butadiene rubber has a 1,2-vinyl bond, and at least one selected from a cis-1,4 bond and a trans-1,4 bond; and a ratio of the numbers of moles of the 1,4 bonds to a total number of moles of the 1,2-vinyl bond, the cis-1,4 bond, and the trans-1,4 bond is 31 mol % or more and 61 mol % or less.

2 Claims, 2 Drawing Sheets

CHARGING MEMBER

CROSS-REFERENCE TO RELATED APPLICATIONS

This application is a continuation of International Application No. PCT/JP2011/006243, filed Nov. 8, 2011, which claims the benefit of Japanese Patent Application No. 2010-252920, filed Nov. 11, 2010.

BACKGROUND OF THE INVENTION

1. Field of the Invention

The present invention relates to a charging member to be used while being brought into abutment with a photosensitive member in an electrophotographic apparatus, and an electrophotographic apparatus.

2. Description of the Related Art

Japanese Patent Application Laid-Open No. 2007-163849 discloses a charging member that shows a small variation in electrical resistance and hardly contaminates a body to be charged irrespective of the presence or absence of a surface layer. Specifically, the literature discloses an electroconductive member for electrophotography, including, on an electroconductive support, an electroconductive elastic body having: a matrix phase containing an acrylonitrile-butadiene rubber (NBR) and electroconductive particles; and a domain phase containing at least one of the NBR and a styrene-butadiene rubber (SBR). In addition, Japanese Patent Application Laid-Open No. 2007-163849 discloses that the surface of the electroconductive elastic layer is preferably subjected to a release treatment in order that the adhesion of a toner and an external additive to the surface of the electroconductive elastic layer may be controlled. In addition, the literature discloses, as specific means for the treatment, a method involving applying an energy ray such as an electron beam to highly crosslink the surface of the electroconductive elastic layer. A technology involving irradiating the surface of the semielectroconductive elastic layer of a charging member with ultraviolet light to modify its surface property has been disclosed in Japanese Patent Application Laid-Open No. H11-149201 as well.

SUMMARY OF THE INVENTION

The NBR has been often used as a component for the surface layer of a charging member because of, for example, its excellent processability. However, in the case of a charging member having, as a surface layer, an elastic layer using the NBR as the only raw material rubber, a toner or an external additive derived from a developer is liable to adhere to the surface of the charging member because the NBR has a polar group. Such problem has still been susceptible to remediation even when the surface is subjected to such surface modification as described in each of Japanese Patent Applications Laid-Open No. 2007-163849 and H11-149201 described above.

In view of the foregoing, the inventors of the present invention have attempted to add an SBR free of any polar group as a raw material rubber for an elastic layer in addition to the NBR to cope with the problem. As a result, the inventors have been able to effectively suppress the adhesion of a toner or the like to the surface of an elastic layer formed by using a rubber compound containing the NBR and the SBR as raw material rubbers. The tendency was similarly observed in the case where the surface of the elastic layer was irradiated with an electron beam or the like.

However, the inventors of the present invention have found that the use of the SBR as a raw material rubber involves the emergence of a new problem. That is, the elastic layer formed by using the rubber compound containing the NBR and the SBR as raw material rubbers, the elastic layer being obtained through irradiation of an electron beam onto its surface, was apt to undergo compression set as compared with the elastic layer containing the NBR as the only rubber component and obtained through irradiation of an electron beam onto its surface in some cases.

When a charging member is brought into abutment with an electrophotographic photosensitive member while being at rest over a long time period, deformation that is not easily restored, i.e., compression set may occur in part of its surface layer. Hereinafter, the "compression set" is abbreviated as "C set." The charging member in which the C set has partially occurred shows a difference in the charging performance for the electrophotographic photosensitive member between a portion where the C set has occurred and a portion where the C set has not occurred, and the difference in charging performance may appear as streak-like unevenness in an electrophotographic image.

In addition, the inventors have found that the occurrence of the C set needs to be suppressed in the case of the charging member having the elastic layer formed by using the rubber compound containing the NBR and the SBR as raw material rubbers, the elastic layer being obtained through irradiation of an electron beam onto its surface.

In view of the foregoing, the present invention is directed to providing a charging member having an elastic layer to which components derived from a developer hardly adhere even when the charging member is used for a long time period and in which elastic layer the occurrence of compression set is suppressed.

Further, the present invention is directed to providing an electrophotographic apparatus capable of stably forming high-quality electrophotographic images.

According to one aspect of the present invention, there is provided a charging member comprising: an electroconductive support; and an electroconductive elastic layer, wherein:

the elastic layer is formed through irradiation of an electron beam onto a surface of a rubber layer consisting of a crosslinked product of a rubber mixture comprising an acrylonitrile-butadiene rubber and a styrene-butadiene rubber;

the styrene-butadiene rubber has a 1,2-vinyl bond represented by the following formula (1), and at least one bond selected from a cis-1,4 bond represented by the following formula (2) and a trans-1,4 bond represented by the following formula (3); and a ratio of a sum of the numbers of moles of the cis-1,4 bond and the trans-1,4 bond to a total number of moles of the 1,2-vinyl bond, the cis-1,4 bond, and the trans-1,4 bond is 31 mol % or more and 61 mol % or less:

Formula (1)

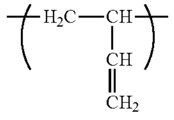

Formula (2)

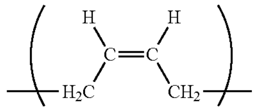

-continued

Formula (3)

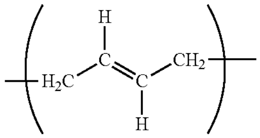

According to another aspect of the present invention, there is provided an electrophotographic apparatus, comprising: the aforementioned charging member; and an electrophotographic photosensitive member disposed to be chargeable by the charging member.

Further features of the present invention will become apparent from the following description of exemplary embodiments with reference to the attached drawings.

DESCRIPTION OF THE EMBODIMENTS

The inventors of the present invention have made studies to achieve the objects. As a result, the inventors have found that the objects can be favorably achieved when an SBR having a predetermined range of the number of moles of a 1,2-vinyl bond to the total number of moles of the 1,2-vinyl bond, a cis-1,4 bond, and a trans-1,4 bond resulting from a butadiene skeleton in a molecule thereof is used as the SBR serving as a raw material rubber for an elastic layer.

That is, the inventors have revealed that the ease with which the C set occurs in an elastic layer formed by using a rubber mixture containing an NBR and an SBR as raw material rubbers and performing electron beam irradiation lies in a difference in ease of cleavage of bonding in response to an electron beam among the three kinds of double bonds present in the molecular structure of the SBR.

Figure 4:
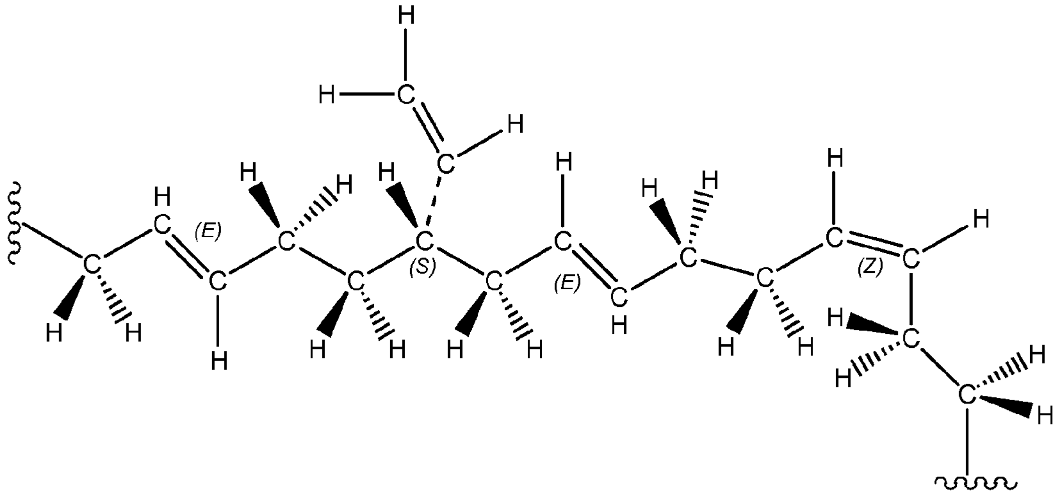
FIG. 4 is a sectional view of a process cartridge according to the present invention.

FIG. 4 illustrates the chemical structure of a butadiene unit present in a molecule of the SBR. Three kinds of double bonds, i.e., a 1,2-vinyl bond, a cis-1,4 bond, and a trans-1,4 bond are present in the butadiene unit. In addition, the inventors have found that the double bond forming the 1,2-vinyl bond out of those three kinds of double bonds cleaves more easily upon electron beam irradiation than the other two kinds of double bonds do. In view of the foregoing, the inventors have conducted an experiment on the basis of the prediction that the amount of the 1,2-vinyl bond in the SBR to be used as a raw material rubber affects the extent to which the crosslinked structure of a rubber layer containing the SBR develops when the rubber layer is irradiated with an electron beam. As a result, the inventors have found that as predicted, adjusting the amount of the 1,2-vinyl bond in the SBR can increase the hardness of an elastic layer formed through electron beam irradiation, thereby providing an elastic layer in which C set hardly occurs.

Hereinafter, the present invention is described in detail.

Figure 1:
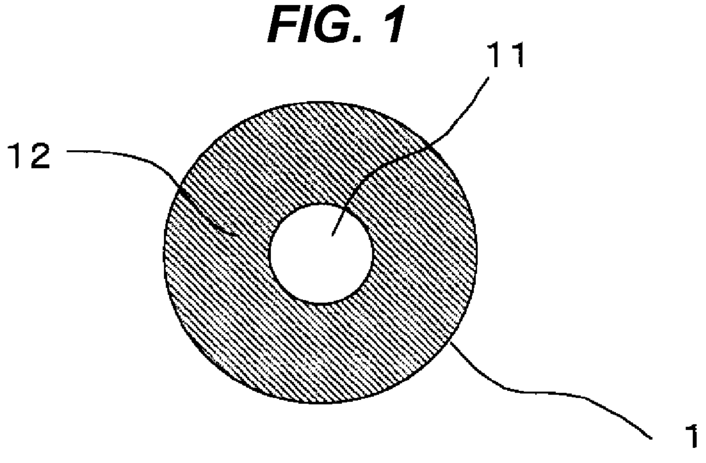
FIG. 1 is a schematic sectional view for illustrating an example of the construction of a charging roller.

FIG. 1 illustrates a sectional view of a charging roller 1 according to the present invention. The charging roller 1 has an electroconductive support 11 and an electroconductive elastic layer 12 as a surface layer formed on the support 11.

<Elastic Layer>

The elastic layer is obtained through irradiation of an electron beam onto the surface of a rubber layer formed of a crosslinked product of a rubber mixture containing an acrylonitrile-butadiene rubber (NBR) and a styrene-butadiene rubber (SBR).

A mixing ratio (molar ratio, (NBR:SBR)) between the NBR and the SBR in the rubber mixture is preferably 90 mol %:10 mol % to 10 mol %:90 mol %, particularly preferably 80 mol %:20 mol % to 20 mol %:80 mol %.

Increasing the ratio of the SBR is advantageous for the suppression of the adhesion of a toner or the like because the polarity of the surface of the elastic layer tends to further reduce. Meanwhile, increasing the ratio of the NBR is advantageous for the suppression of the occurrence of the C set because the crosslinked structure of the surface of the elastic layer upon electron beam irradiation develops to a higher degree.

<<NBR>>

The acrylonitrile-butadiene rubber (NBR) is a copolymer of acrylonitrile and 1,3-butadiene.

The NBR is a rubber suitably used as a component for the elastic layer because the NBR is excellent in processability and abrasion resistance. However, toner or an external additive is apt to adhere to a rubber layer containing the NBR as the only rubber component because the NBR has high polarity. Although the tendency is alleviated through irradiation of an electron beam onto the rubber layer to perform surface modification, the tendency has still been susceptible to further alleviation.

The characteristics of the NBR change depending on its copolymerization ratio between acrylonitrile and butadiene in a molecule thereof. A larger amount of the acrylonitrile results in a further reduction in the motion of the NBR molecule and thus is advantageous for the suppression of the exudation of a low-molecular weight component from the elastic layer and the suppression of its deterioration due to ozone or the like. Meanwhile, a larger amount of the butadiene component can further suppress an increase in the hardness of the elastic layer in a cold environment.

Therefore, the so-called moderate-high nitrile in which the molar ratio of the number of moles of an acrylonitrile unit to the total number of moles of the acrylonitrile unit and a butadiene unit is 31 mol % or more and 36 mol % or less is preferably used as the NBR according to the present invention.

An arbitrarily denatured NBR such as a carboxylated XNBR, an NBIR obtained by replacing part of butadiene with isoprene, an HNBR obtained by hydrogenating part of the double bonds of butadiene, or a partially crosslinked NBR can also be used in the present invention.

<<SBR>>

The SBR according to the present invention is such that the ratio of the sum of the numbers of moles of 1,4 bonds, that is, a cis-1,4 bond represented by the following formula (2) and a trans-1,4 bond represented by the following formula (3) to the total number of moles of a 1,2-vinyl bond represented by the following formula (1), the cis-1,4 bond and the trans-1,4 bond, derived from the butadiene skeleton is 31 mol % or more and 61 mol % or less.

Formula (1)

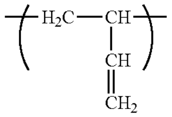

Formula (2)

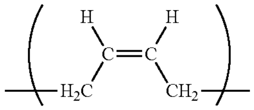

Formula (3)

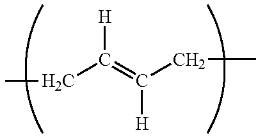

FIG. 4 illustrates the structural formula of the butadiene skeleton moiety of the SBR. The inventors of the present invention have obtained the following new finding. The amount of the 1,2-vinyl bond present in the butadiene skeleton moiety in the molecule of the SBR largely contributes to the extent to which a rubber layer cures when the rubber layer is irradiated with an electron beam.

That is, the 1,2-vinyl bond has a smaller intermolecular binding energy than those of the cis-1,4 bond and the trans-1,4 bond, and hence the double bond of the 1,2-vinyl bond moiety tends to cleave relatively easily upon electron beam irradiation. Accordingly, the amount of the 1,2-vinyl bond in the SBR is considered to largely affect the extent to which a rubber layer containing the SBR cures when the rubber layer is irradiated with an electron beam.

In addition, the SBR according to the present invention is such that the ratio of the sum of the numbers of moles of the cis-1,4 bond and the trans-1,4 bond to the total number of moles of the 1,2-vinyl bond, the cis-1,4 bond and the trans-1,4 bond is 31 mol % or more and 61 mol % or less, in other words, a ratio of the number of moles of the 1,2-vinyl bond to the total number of moles of the 1,2-vinyl bond, the cis-1,4 bond and the trans-1,4 bond is 39 mol % or more and 69 mol % or less. As a result, the using of the SBR in combination with the NBR as a raw material rubber for a rubber layer results in suppression of a reduction in the extent to which the crosslinked structure in the rubber layer develops after electron beam irradiation.

The SBR according to the present invention can be obtained by, for example, polymerizing a vinyl aromatic hydrocarbon and a conjugated diene in a hydrocarbon solvent with an organolithium compound as an initiator. For example, styrene can be used as the vinyl aromatic hydrocarbon to be used in the present invention. For example, 1,3-butadiene can be used as the conjugated diene.

The SBR is obtained by, for example, anion living polymerization in a hydrocarbon solvent with an initiator such as an organic alkali metal compound. Examples of the hydrocarbon solvent include pentane, hexane, heptane, octane, methylcyclopentane, cyclohexane, benzene, toluene, and xylene. Of those, cyclohexane and heptane are preferred.

In addition, an aliphatic hydrocarbon alkali metal compound, an aromatic hydrocarbon alkali metal compound, an organic amino alkali metal compound, or the like generally known to have anion polymerization activities for the conjugated diene and the aromatic vinyl compound can be used as the polymerization initiator. Examples of the alkali metal include lithium, sodium, and potassium. Suitable organic alkali metal compounds are aliphatic and aromatic hydrocarbon lithium compounds each having 1 to 20 carbon atoms, and examples thereof include a compound containing one lithium atom in a molecule thereof, and a dilithium compound, a trilithium compound, and a tetralithium compound each containing a plurality of lithium atoms in a molecule thereof. Specific examples thereof include n-propyllithium, n-butyllithium, sec-butyllithium, tert-butyllithium, hexamethylene dilithium, butadienyl dilithium, isoprenyl dilithium, a reaction product of diisopropenylbenzene and sec-butyllithium, and a reaction product of divinylbenzene, sec-butyllithium, and a small amount of 1,3-butadiene.

A potassium compound may be added together with the polymerization initiator when one attempts to improve the reactivity of the polymerization initiator, or when he or she attempts to array the molecules of the aromatic vinyl compound to be introduced into the polymer at random or to provide a simple chain of the aromatic vinyl compound. Examples of the potassium compound added together with the polymerization initiator include potassium alkoxides and potassium phenoxides represented by potassium isopropoxide, potassium t-butoxide, potassium t-amyloxide, potassium n-heptaoxide, potassium benzyloxide, and potassium phenoxide; potassium salts of isovaleric acid, capric acid, lauric acid, palmitic acid, stearic acid, oleic acid, linolenic acid, benzoic acid, phthalic acid, and 2-ethylhexanoic acid; a potassium salt of an organic sulfonic acid such as dodecylbenzene sulfonic acid, tetradecylbenzene sulfonic acid, hexadecylbenzene sulfonic acid, and octadecylbenzene sulfonic acid; and a potassium salt of an organic phosphorous acid partial ester such as diethyl phosphite, diisopropyl phosphite, diphenyl phosphite, dibutyl phosphite, and dilauryl phosphite.

Further, the SBR may be obtained by copolymerizing butadiene as a monomer, and in some cases, styrene at a predetermined ratio with a polar organic compound such as ether, a polyether, a tertiary amine, a polyamine, a thioether, or hexamethylphosphortriamide as a compound for regulating the amount of the vinyl bond in a molecular structure derived from butadiene as required. The amount of the vinyl bond can be controlled by adjusting the amount of the polar organic compound used and the temperature for the polymerization. The amount of the vinyl bond can be grasped with the aid of a nuclear magnetic resonance apparatus (NMR).

One or more kinds of other rubbers may be added to an electroconductive elastic body composition to such an extent that the characteristics of the present invention are not largely affected. Examples of the other rubbers include an ethylene-propylene-diene copolymer (EPDM), a polybutadiene, a natural rubber, a polyisoprene, chloroprene (CR), a silicon rubber, a urethane rubber, and a fluororubber.

In the present invention, carbon black can be incorporated as electroconductive particles into the rubber mixture. The amount of the carbon black compounded may be controlled so that the electrical resistance of the elastic layer may take a desired value. As a guideline, the amount of the carbon black compounded is preferably 20 to 70 parts by mass, particularly preferably 25 to 60 parts by mass based on 100 parts by mass of the raw material rubbers.

The kind of the carbon black is not particularly limited, and specific examples thereof include: electroconductive carbon blacks such as ketchen black and acetylene black; and carbon blacks for rubber such as SAF, ISAF, HAF, FEF, GPF, SRF, FT, and MT.

Further, a filler, a processing aid, a crosslinking aid, a crosslinking accelerator, a crosslinking supplement accelerator, a crosslinking retarder, a softening agent, a plasticizer, a dispersant, or the like, generally used as a compounding agent for rubber may be added to the rubber mixture as required.

A mixing method involving using a closed mixer such as a Banbury mixer or a pressure kneader, a mixing method involving using an open mixer such as an open roll, or the like can be given as a method of mixing those raw materials.

A method of producing the support on which the elastic layer has been formed is, for example, a method involving: extruding the rubber mixture in an unvulcanized state into a tube shape with an extruder; vulcanizing the extrudate in a vulcanizer to provide a rubber tube; forcing a mandrel into the rubber tube; and then polishing the surface of the rubber tube to provide a desired outer diameter.

Another method can be, for example, a method involving: subjecting the rubber mixture to co-extrusion together with a mandrel with an extruder mounted with a crosshead; forming a rubber layer having a predetermined outer diameter on the circumferential surface of the mandrel; then fixing the mandrel in a cylindrical mold having a predetermined inner diameter; and vulcanizing the rubber layer to provide the elastic layer.

The elastic layer may be ground in order that the elastic layer may have a desired shape or desired surface roughness.

A method of grinding the surface of the elastic layer includes, for example, a traverse grinding mode involving moving a grindstone or a roller in the thrust direction of the roller to perform grinding. A plunge cut grinding mode involving performing cutting without reciprocating a grinding stone wider than a roller length while rotating the roller about a mandrel axis is also given. Of those, the plunge cut cylindrical grinding mode is more preferred because the mode has such an advantage that the entire width of the elastic body roller can be ground all at once, and hence can shorten a processing time as compared with the traverse cylindrical grinding mode.

In the present invention, the surface of the elastic layer after the vulcanization is irradiated with an electron beam so that the surface of the elastic layer and a vicinity thereof may be cured.

Figure 3:
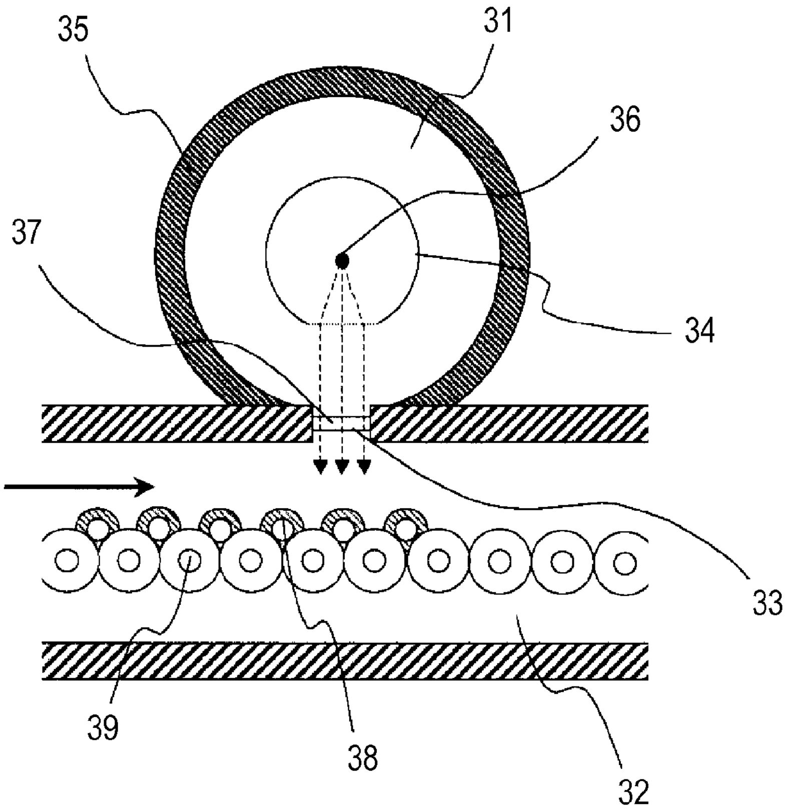
FIG. 3 is a schematic view for illustrating an example of the construction of an electron beam irradiation apparatus.

FIG. 3 illustrates a schematic view of an electron beam irradiation apparatus to be used for irradiating the surface of the elastic layer with an electron beam.

The electron beam irradiation apparatus according to the present invention irradiates the surface of a roller with an electron beam while rotating the roller, and includes an electron beam-generating portion 31, an irradiation room 32, and an irradiation port 33 as illustrated in FIG. 3.

The electron beam-generating portion 31 has a terminal 34 for generating an electron beam and an accelerating tube 35 for accelerating the electron beam generated in the terminal 34 in a vacuum space (accelerating space). In addition, a degree of vacuum in the electron beam-generating portion is kept at $10^{-3}$ to $10^{-6}$ Pa with a vacuum pump or the like (not shown) in order that an electron may be prevented from colliding with a gas molecule to lose its energy.

A current is passed through a filament 36 with a power source (not shown) to heat the filament. As a result, the filament 36 emits thermoelectrons. Of the thermoelectrons, only a thermoelectron that has passed the terminal 34 is effectively taken out as an electron beam. Then, the electron beam is accelerated in the accelerating space in the accelerating tube 35 by an accelerating voltage for the electron beam. After that, the electron beam penetrates an irradiation port foil 37, and then a rubber roller 38 conveyed in the irradiation room 32 below the irradiation port 33 is irradiated with the beam.

When the rubber roller 38 obtained by coating the periphery of the mandrel with the elastic layer is irradiated with an electron beam, an atmosphere in the irradiation room 32 is a nitrogen atmosphere. In addition, the rubber roller 38 is moved from the left side to the right side in FIG. 3 in the irradiation room by conveying means by being rotated with a roller-rotating member 39. It should be noted that the peripheries of the electron beam-generating portion 31 and the irradiation room 32 are subjected to lead shielding (not shown) lest an X-ray to be secondarily generated at the time of the electron beam irradiation should leak to the outside.

The irradiation port foil 37 is formed of a metal foil, and serves as a partition between a vacuum atmosphere in the electron beam-generating portion and an air atmosphere in the irradiation room. In addition, an electron beam is taken out to the inside of the irradiation room through the irradiation port foil 37. When an electron beam is applied to the irradiation of the roller, the atmosphere in the irradiation room 32 where the roller is irradiated with the electron beam is a nitrogen atmosphere. Accordingly, the irradiation port foil 37 to be provided at a boundary between the electron beam-generating portion 31 and the irradiation room 32 is desirably as described below. The foil is free of any pinhole and has such a mechanical strength that the vacuum atmosphere in the electron beam-generating portion can be sufficiently maintained, and an electron beam easily permeates the foil. Accordingly, the irradiation port foil 37 is desirably a metal having a small specific gravity and a small wall thickness, and hence an aluminum or titanium foil is typically used.

Conditions for a curing treatment with an electron beam are determined by the accelerating voltage for, and the dose of, the electron beam. The accelerating voltage affects a curing treatment depth, and as a guideline, the accelerating voltage in the present invention is 40 kV or more and 300 kV or less as a low energy region, in particular 80 kV or more and 150 kV or less. This is because of the following reasons. A sufficient treatment thickness for obtaining an effect of the present invention can be obtained. In addition, an increase in apparatus cost involved in an increase in the size of the electron beam irradiation apparatus is suppressed.

The dose of the electron beam in the electron beam irradiation is defined by the following mathematical expression (1).

$$D=(K\cdot I)/V \qquad \text{Mathematical expression (1)}$$

In the mathematical expression (1), D represents a dose (kGy), K represents an apparatus constant, I represents an electron current (mA), and V represents a treatment speed (m/min). In addition, the apparatus constant K is a constant representing the efficiency of an individual apparatus, and is an indicator of the performance of the apparatus. The apparatus constant K is determined by measuring the dose while changing the electron current and the treatment speed under a constant-accelerating voltage condition.

The dose of the electron beam was measured as described below. A film for dosimetry was attached to the surface of the roller, the resultant was actually treated with the electron beam irradiation apparatus, and the film for dosimetry on the surface of the roller was subjected to measurement with a film dosimeter. The film for dosimetry and the film dosimeter used are an FWT-60 and a model FWT-92D (each of which is a trade name, manufactured by Far West Technology, Inc.), respectively.

Figure 2:
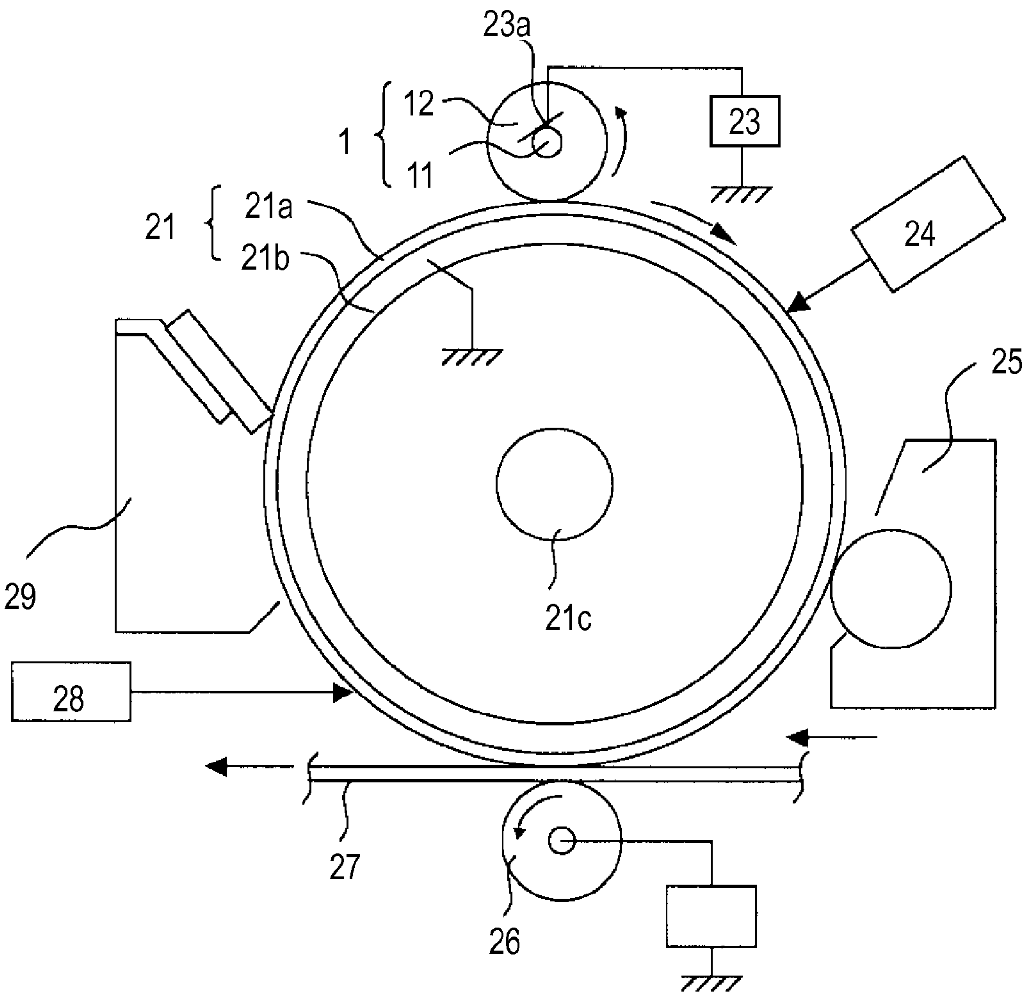
FIG. 2 is a sectional view of an electrophotographic apparatus according to the present invention.

FIG. 2 is a sectional view of an electrophotographic apparatus according to the present invention. Reference numeral 21 represents an electrophotographic photosensitive member as a body to be charged, and the electrophotographic photosensitive member of this example is a drum-shaped electrophotographic photosensitive member including, as basic component layers, an electroconductive support 21*b* having conductivity made of aluminum or the like and a photosensitive layer 21*a* formed on the support 21*b*. The member is rotationally driven clockwise in the figure at a predetermined circumferential speed about an axis 21*c*. Reference numeral 1 represents a charging roller, which is a charging member of the present invention.

The charging roller 1 is placed so as to contact the electrophotographic photosensitive member 21, and electrically charges the electrophotographic photosensitive member to predetermined polarity and a predetermined potential (primary charging). The charging roller 1 is formed of a mandrel 11 and an electroconductive elastic layer 12 formed on the mandrel 11, and both end portions of the mandrel 11 are pressed against the electrophotographic photosensitive member 21 by pressing means (not shown) so that the roller may be rotated following the rotational driving of the electrophotographic photosensitive member 21. A predetermined DC bias is applied to the mandrel 11 by a rubbing power source 23*a* connected to a power source 23. Thus, the electrophotographic photosensitive member 21 is subjected to contact charging to predetermined polarity and a predetermined potential.

The electrophotographic photosensitive member 21 whose circumferential surface has electrically been charged by the charging roller 1 is then subjected to the exposure of target image information (such as laser beam scanning exposure or the slit exposure of an original image) by exposing means 24 so that electrostatic latent images corresponding to the target image information may be formed on the circumferential surface. The electrostatic latent images are then sequentially visualized as toner images by a developing member 25. The toner images are then sequentially transferred by transferring means 26 onto a transfer material 27 taken out of a sheet-feeding portion (not shown) in sync with the rotation of the electrophotographic photosensitive member 21, and conveyed to a transfer portion between the electrophotographic photosensitive member 21 and the transferring means 26 at a proper timing. The transferring means 26 of this example is a transfer roller, and the toner images on the side of the electrophotographic photosensitive member 21 are transferred onto the transfer material 27 by charging the means to polarity opposite to that of toner from the reverse side of the transfer material 27.

The transfer material 27 having the toner images transferred onto its surface is separated from the electrophotographic photosensitive member 21 and conveyed to fixing means (not shown) so that the images may be fixed. Then, the material is output as an image-formed product. Alternatively, when an image is formed on its rear surface as well, the material is conveyed to means for reconveyance to the transfer portion.

The circumferential surface of the electrophotographic photosensitive member 21 after the image transfer is subjected to pre-exposure by pre-exposing means 28 so that residual charge on the electrophotographic photosensitive drum may be removed (electrostatically discharged). Transfer residual toner or the like is removed from the circumferential surface of the electrophotographic photosensitive member 21 after the image transfer by a cleaning member 29 so that the surface may be cleaned. Then, the electrophotographic photosensitive member is repeatedly subjected to image formation. The cleaning member 29 is formed of an elastic blade.

According to the present invention, a charging member can be obtained which has the following effects: The fixing or sticking of a toner to its surface, or the adhesion of a toner or an external additive derived from a developer to the surface of an electrophotographic photosensitive member is suppressed, and the C set hardly occurs in the charging member.

Further, according to the present invention, an electrophotographic apparatus capable of stably forming high-quality electrophotographic images can be obtained.

EXAMPLES

Hereinafter, the present invention is described in more detail by way of examples. The term "part(s)" means "part(s) by mass" unless otherwise stated. In addition, commercial high-purity products were used as the reagents or the like unless otherwise specified.

(Synthesis of Styrene-Butadiene Rubber)

<Styrene-Butadiene Rubber (SBR)-1>

Materials shown in Table 1 were loaded into an autoclave reaction vessel having an internal volume of 15 L and replaced with nitrogen, and then the temperature of the contents in the reaction vessel was adjusted to 30° C. After that, 645 mg (10.08 mmol) of n-butyllithium was added to the contents, and then polymerization was initiated.

TABLE 1

| | |
|---|---|
| Cyclohexane | 8,250 g |
| Tetrahydrofuran | 27 g |
| Styrene | 450 g |
| 1,3-Butadiene | 1,320 g |
| Potassium dodecylbenzenesulfonate | 294 mg (0.81 mmol) |

At the point in time when the polymerization conversion rate reached 99%, 30 g of butadiene was added to the resultant, and then the polymerization was continued for an additional five minutes. After that, 2,6-di-tert-butyl-p-cresol was added to the polymer solution after the reaction, and then the produced polymer was coagulated. After that, the resultant was dried under reduced pressure at a temperature of 60° C. for 24 hours. Thus, a styrene-butadiene rubber-1 was obtained. The amount of the 1,2-vinyl bond was identified by the NMR measurement of the product thus obtained. A 1H-NMR spectrum was measured by FT-NMR (400 MHz, JNM-EX400 (manufactured by JEOL Ltd.)), and then the amount of the 1,2-vinyl bond, V (%), was calculated from the following mathematical expression (2) by using an integrated intensity ratio between a proton ($=CH_2$) based on a vinyl bond having a chemical shift of 4.7 to 5.2 ppm (defined as a signal C0) and a proton ($=CH-$) based on a 1,4 bond having a chemical shift of 5.2 to 5.8 ppm (defined as a signal D0).

$$V=(2C0/(C0+2D0))\times 100 \qquad \text{Mathematical expression (2)}$$

<SBR-2>

An SBR-2 was obtained in the same manner as in the styrene-butadiene rubber-1 except that the amount of tetrahydrofuran was changed to 36 g.

<SBR-3>

An SBR-3 was obtained in the same manner as in the styrene-butadiene rubber-1 except that the amount of tetrahydrofuran was changed to 84 g.

<SBR-4>

An SBR-4 was obtained in the same manner as in the styrene-butadiene rubber-1 except that the amount of tetrahydrofuran was changed to 135 g.

<SBR-5>

An SBR-5 was obtained in the same manner as in the styrene-butadiene rubber-1 except that the amount of tetrahydrofuran was changed to 8 g.

Table 2 below shows the amount of the 1,2-vinyl bond and the amount of the 1,4 bond in the butadiene for each of the SBR-1 to the SBR-5.

TABLE 2

| | Amount of 1,2-vinyl bond in butadiene (mol %) | Amount of 1,4 bond in butadiene (mol %) |
|---|---|---|
| SBR-1 | 39 | 61 |
| SBR-2 | 45 | 55 |
| SBR-3 | 69 | 31 |
| SBR-4 | 78 | 22 |
| SBR-5 | 17 | 83 |

Example 1

(Preparation of Rubber Material)

Materials shown in Table 3 were mixed with a 6-L pressure kneader for 16 minutes at a filling factor of 65 vol % and a blade rotational frequency of 30 rpm. Thus, an unvulcanized rubber composition was obtained.

TABLE 3

| | |
|---|---|
| SBR-1 | 50 Parts by mass |
| Acrylonitrile-butadiene rubber (trade name: N230SV, manufactured by JSR Corporation) | 50 Parts by mass |
| Zinc stearate | 1 part by mass |
| Zinc oxide | 5 Parts by mass |
| Carbon black (trade name: TOKABLACK #7360SB, manufactured by TOKAI CARBON CO., LTD.) | 50 Parts by mass |

Materials shown in Table 4 were added to 156 parts by mass of the unvulcanized rubber composition, and then the contents were mixed with an open roll having a roll diameter of 12 inches for 20 minutes at a front roll rotational frequency of 8 rpm, a back roll rotational frequency of 10 rpm, and a roll interval of 2 mm. Thus, an unvulcanized rubber composition for the formation of an elastic layer was obtained.

TABLE 4

| | |
|---|---|
| Sulfur | 1.2 Parts by mass |
| Tetrabenzylthiuram disulfide (trade name: NOCCELER TBzTD, manufactured by OUCHI SHINKO CHEMICAL INDUSTRIAL CO., LTD.) | 1.0 Parts by mass |
| N-t-Butyl-2-benzothiazolesulfenimide (trade name: SANTOCURE-TBSI, manufactured by FLEXSYS) | 1.0 Parts by mass |

(Molding of Rubber Roller)

The unvulcanized rubber composition for an elastic layer was extruded into a tube shape with a vented rubber extruder (ϕ45-mm vent extruder, L/D=20, manufactured by Nakata Engineering Co., Ltd.), and was then subjected to primary vulcanization at 160° C. for 30 minutes with steam under pressure in a vulcanizer. Thus, a rubber tube having an outer diameter of 10 mm, an inner diameter of 5.5 mm, and a length of 250 mm was obtained.

An electroconductive hot melt adhesive was applied to a cylindrical electroconductive mandrel (made of steel and having a nickel-plated surface) having a diameter of 6 mm and a length of 252 mm on a central portion 232 mm long in the axial direction of the cylindrical surface of the mandrel, and was then dried at a temperature of 80° C. for 30 minutes. The rubber tube was forced onto the mandrel to which the adhesive had been applied, and then the resultant was subjected to secondary vulcanization and an adhesion treatment in a hot-air oven at 160° C. for 30 hours. Both rubber end portions of the resultant composite were cut so that an unpolished roller whose rubber portion had a length of 232 mm was produced. The rubber portion of the unpolished roller was polished with a polishing machine (LEO-600-F4-BME manufactured by MINAKUCHI MACHINERY WORKS LTD.). Thus, a rubber roller 1 having, as a surface layer, a crown-shaped elastic layer having an end portion diameter of 8.35 mm and a central portion diameter of 8.50 mm was obtained.

(Measurement of Surface Hardness of Rubber Roller)

The surface hardness of the rubber roller 1 was measured with a microhardness meter (trade name: MD-1 capa, manufactured by KOBUNSHI KEIKI CO., LTD.) in an environment having a temperature of 23° C. and a relative humidity of 55% RH according to a peak hold mode. More specifically, a charging member was placed on a metal plate, a metal block was placed to simply fix the charging member lest the charging member should roll, a measuring terminal was accurately pressed against the center of the charging member from a direction vertical to the metal plate, and a value after a lapse of 5 seconds from the pressing was read. The measurement was performed on 3 sites in the circumferential direction of each of both end portions at positions distant from 30 to 40 mm from the rubber end portions of the charging member and the central portion thereof, i.e., a total of 9 sites. The average of the resultant measured values was defined as the surface hardness of the rubber roller.

In addition, the surface hardness of the rubber roller 1 was measured with a universal hardness meter (trade name: Ultra-microhardness Meter H-100V, manufactured by Fischer). A quadrangular pyramidal diamond was used as an indenter for measurement. Universal hardness is a physical property value determined by pressing the indenter into an object of measurement while applying a load, and is determined as a ratio "(test load)/(surface area of indenter under test load)" ($N/mm^2$). In the measuring apparatus, the indenter such as a quadrangular pyramid is pressed into the object of measurement while a predetermined, relatively small test load is applied, at the point in time when a predetermined pressing depth is achieved, the surface area of the indenter contacting the object is determined from the pressing depth, and the universal hardness is determined from the above equation. In other words, when the indenter is pressed into the object of measurement under a constant-load measurement condition, a stress at the time to the depth to which the indenter is pressed is defined as the universal hardness.

In addition, the maximum hardness for a pressing depth of the indenter of up to 10 μm was defined as the surface hardness of the rubber roller 1.

(Electron Beam Irradiation Treatment for Surface Layer)

A charging roller 1 was obtained through irradiation of an electron beam onto the surface of the rubber layer of the rubber roller 1. An electron beam irradiation apparatus 5 having a maximum accelerating voltage of 150 kV and a maximum electron current of 40 mA (manufactured by Iwasaki Electric Co., Ltd.) was used in the electron beam irradiation, and a nitrogen gas purge was performed at the time of the irradiation. Table 5 below shows treatment conditions.

TABLE 5

| | |
|---|---|
| Accelerating voltage | 150 kV |
| Electron current | 35 mA |
| Treatment speed | 1 m/min. |
| Oxygen concentration | 100 ppm |

(Measurement of Surface Hardness of Charging Roller)

The surface hardness of the charging roller 1 was measured with a microhardness meter (trade name: MD-1 capa, manufactured by KOBUNSHI KEIKI CO., LTD.) and a universal hardness meter (trade name: Ultramicrohardness Meter H-100V, manufactured by Fischer). An indenter for measurement and the measurement conditions were the same as those for the measurement of the surface hardness of the rubber roller 1.

(Image Evaluations)

The charging roller 1 was mounted as a charging roller on a process cartridge for a laser printer capable of outputting A4-sized paper in a longitudinal direction (trade name: LaserJet P1005, manufactured by Hewlett-Packard Company). It should be noted that the charging roller 1 used here was different from that subjected to the resistance measurement and the hardness measurement. The process cartridge was mounted on the laser printer and then 1,000 electrophotographic images were output.

The images output at this time are each such a ruler line-like image that a margin of 118 dots is repeated after a horizontal line of 2 dots.

It should be noted that the image outputting was performed in an environment at a temperature of 23° C. and a relative humidity of 50% RH. In addition, the image outputting was also performed according to the so-called intermittent mode in which the rotation of an electrophotographic photosensitive drum was stopped over 7 seconds every time one (1) electrophotographic image was output.

(Evaluation 1)

The resultant 1,000 electrophotographic images were visually observed and evaluated for the presence or absence of an image defect resulting from matter stuck-fast to the surface of the charging roller or electrophotographic photosensitive member in accordance with the criteria of Table 6 below.

The charging roller electrically charges the surface of the photosensitive member by means of discharge occurring at a minute gap around a contact nip between the charging roller and the photosensitive member. A corona product or a component derived from a developer (such as a toner or an external additive) produced at this time is brought into press contact with and fixed to the surface of the charging roller or photosensitive member. As a result, an image defect resulting from any such product or component may occur. In addition, a charging roller having a lower surface hardness results in a larger area of contact between the charging roller and the photosensitive member, and hence a matter stuck-fast to the surface of the charging roller or photosensitive member is apt to form. Accordingly, a correlation between the surface hardness of the charging roller and an image defect can be grasped in this evaluation.

(Evaluation 2)

Next, the laser printer after the completion of the output of the 1,000 electrophotographic images was left at rest in an environment at a temperature of 25° C. and a relative humidity of 40% for 24 hours, and then one (1) electrophotographic image was output in the same environment. The image was visually observed and evaluated for the presence or absence of a streak at the time of start-up and its state in accordance with the criteria described in Table 7 below. The streak at the time of the start-up is a phenomenon in which the toner, external additive or abrasion powder remaining between the charging roller and the photosensitive member appears as an image failure when the outputting is restarted as a result of their long-term presence between the charging roller and the photosensitive member.

TABLE 6

| Evaluation rank | Criterion |
|---|---|
| A | No defects are observed in the 1,000 electrophotographic images. |
| B | The number of electrophotographic images in which defects are observed is 20 or less. |
| C | The number of electrophotographic images in which defects are observed is 50 or more and 100 or less. |
| D | The number of electrophotographic images in which defects are observed is 200 or more. |

TABLE 7

| Evaluation rank | Criterion |
|---|---|
| A | No streak is observed. |
| B | A streak is observed in a region ranging from each of both ends of the image to a distance of 5 mm. |
| C | A streak is observed in a region ranging from each of both ends of the image to a distance of 5 to 10 mm. |
| D | A streak covering the paper width is observed. |

(Evaluation 3)

The charging roller 1 was mounted as a charging roller on the process cartridge for the laser printer. The process cartridge was left to stand in an environment at a temperature of 40° C. and a relative humidity of 95% RH for 1 month (severe standing). Next, the process cartridge was left to stand in an environment at a temperature of 23° C. and a relative humidity of 50% for 6 hours. After that, the process cartridge was mounted on the laser printer, and then 3 halftone images (each of which was such an image that horizontal lines each having a width of 1 dot were drawn in the rotation direction of the photosensitive member and a direction vertical thereto at an interval of 2 dots) were output in an environment at a temperature of 23° C. and a relative humidity of 50%. The 3 halftone images thus output were evaluated for the condition of the occurrence of a streak or the like resulting from the C set of the charging roller through visual observation by criteria shown in Table 8 below.

TABLE 8

| | |
|---|---|
| Rank 1 | The occurrence of a streak or the like resulting from the C set of the charging roller is not observed in any one of the 3 images. |
| Rank 2 | A thin streak is occurring in one of the images in accordance with the rotational period of the charging roller. |
| Rank 3 | Thin streaks are occurring in two of the images in accordance with the rotational period of the charging roller. |
| Rank 4 | Clear streaks are occurring in the 3 images in accordance with the rotational period of the charging roller. |

Examples 2 and 3

A rubber roller 2 and a rubber roller 3 were each produced in the same manner as in Example 1 except that an unvulcanized rubber composition obtained by changing the SBR-1 in the material composition of Table 3 in Example 1 to the SBR-2 or the SBR-3 was used. The surface hardnesses of the rubber roller 2 and the rubber roller 3 were measured in the same manner as in Example 1. In addition, a charging roller 2 and a charging roller 3 were each obtained through irradiation of an electron beam onto the surface of each of the rubber roller 2 and the rubber roller 3 to cure the surface in the same manner as in Example 1. Those charging rollers were subjected to surface hardness measurement and image evaluations in the same manner as in Example 1.

Examples 4 and 5

A rubber roller 4 and a rubber roller 5 were each produced in the same manner as in Example 1 except that the compounding amount of the carbon black in the material composition of Table 3 in Example 1 was changed to 30 parts by mass or 70 parts by mass. The surface hardnesses of the rubber roller 4 and the rubber roller 5 were measured in the same manner as in Example 1. In addition, a charging roller 4 and a charging roller 5 were each obtained through irradiation of an electron beam onto the surface of each of the rubber roller 4 and the rubber roller 5 to cure the surface in the same manner as in Example 1. Those charging rollers were subjected to surface hardness measurement and image evaluations in the same manner as in Example 1.

Example 6

A rubber roller 6 was molded in the same manner as in Example 1 except that in the material composition of Table 3 in Example 1, the SBR-1 was changed to the SBR-3 and the compounding amount of the carbon black was changed to 30 parts by mass. The surface hardness of the rubber roller 6 was measured in the same manner as in Example 1. Further, a charging roller 6 was obtained through irradiation of an electron beam onto the surface of the rubber roller 6 to cure the surface in the same manner as in Example 1. The charging roller 6 was subjected to surface hardness measurement and image evaluations in the same manner as in Example 1.

Example 7

A rubber roller 7 was molded in the same manner as in Example 1 except that in the material composition of Table 3 in Example 1, the SBR-1 was changed to the SBR-3 and the compounding amount of the carbon black was changed to 70 parts by mass. The surface hardness of the rubber roller 7 was measured in the same manner as in Example 1. Further, a charging roller 7 was obtained through irradiation of an electron beam onto the surface of the rubber roller 7 to cure the surface in the same manner as in Example 1. The charging roller 7 was subjected to surface hardness measurement and image evaluations in the same manner as in Example 1.

Example 8

A rubber roller 8 was produced in the same manner as in Example 1 except that the NBR as a binder polymer in the material composition of Table 3 in Example 1 was changed to an "N250SL" (trade name, manufactured by JSR Corporation, amount of combined acrylonitrile: 20%). The surface hardness of the rubber roller 8 was measured in the same manner as in Example 1. In addition, a charging roller 8 was obtained through irradiation of an electron beam onto the surface of the rubber roller 8 to cure the surface in the same manner as in Example 1. The charging roller 8 was subjected to surface hardness measurement and image evaluations in the same manner as in Example 1.

Example 9

A rubber roller 9 was produced in the same manner as in Example 1 except that in the material composition of Table 3 in Example 1, the NBR as a binder polymer was changed to an "N250SL" (trade name, manufactured by JSR Corporation, amount of combined acrylonitrile: 20%) and SBR-1 was changed to SBR-3. The surface hardness of the rubber roller 9 was measured in the same manner as in Example 1. In addition, a charging roller 9 was obtained through irradiation of an electron beam onto the surface of the rubber roller 9 to cure the surface in the same manner as in Example 1. The charging roller 9 was subjected to surface hardness measurement and image evaluations in the same manner as in Example 1.

Example 10

A rubber roller 10 was produced in the same manner as in Example 1 except that the NBR as a raw material rubber in the material composition of Table 3 in Example 1 was changed to an NBR (trade name: Perbunan 3945, manufactured by LANXESS Corporation, amount of combined acrylonitrile: 39%). The surface hardness of the rubber roller 10 was measured in the same manner as in Example 1.

In addition, a charging roller 10 was obtained through irradiation of an electron beam onto the surface of the rubber roller 10 to cure the surface in the same manner as in Example 1. The charging roller 10 was subjected to surface hardness measurement and image evaluations in the same manner as in Example 1.

Examples 11 and 12

A rubber roller 11 and a rubber roller 12 were each produced in the same manner as in Example 10 except that the SBR-1 in the unvulcanized rubber composition according to Example 10 was changed to the SBR-2 or the SBR-3. The surface hardnesses of the rubber roller 11 and the rubber roller 12 were measured in the same manner as in Example 1.

In addition, a charging roller 11 and a charging roller 12 were each obtained through irradiation of an electron beam onto the surface of each of the rubber roller 11 and the rubber roller 12 to cure the surface in the same manner as in Example 1. Those charging rollers were subjected to surface hardness measurement and image evaluations in the same manner as in Example 1.

Example 13

A rubber roller 13 was molded in the same manner as in Example 1 except the following. In the material composition of Table 3 in Example 1, the NBR as a raw material rubber was changed to an NBR (trade name: N250SL, manufactured by JSR Corporation) and its compounding amount was changed to 80 parts by mass. In addition, in the material composition, the compounding amount of the SBR-1 was changed to 20 parts by mass. The surface hardness of the rubber roller 13 was measured in the same manner as in Example 1.

In addition, a charging roller 13 was obtained through irradiation of an electron beam onto the surface of the rubber roller 13 to cure the surface in the same manner as in Example 1. The charging roller 13 was subjected to surface hardness measurement and image evaluations in the same manner as in Example 1.

Example 14

A rubber roller 14 was produced in the same manner as in Example 13 except that the NBR was changed to an NBR (trade name: N230SV). The surface hardness of the rubber roller 14 was measured in the same manner as in Example 1.

In addition, a charging roller 14 was obtained through irradiation of an electron beam onto the surface of the rubber roller 14 to cure the surface in the same manner as in Example 1. The charging roller 14 was subjected to surface hardness measurement and image evaluations in the same manner as in Example 1.

Example 15

A rubber roller 15 was molded in the same manner as in Example 1 except the following. In the material composition of Table 3 in Example 1, the NBR as a raw material rubber was changed to an NBR (trade name: Perbunan 3945) and its compounding amount was changed to 80 parts by mass. The surface hardness of the rubber roller 15 was measured in the same manner as in Example 1.

In addition, a charging roller 15 was obtained through irradiation of an electron beam onto the surface of the rubber roller 15 to cure the surface in the same manner as in Example 1. The charging roller 15 was subjected to surface hardness measurement and image evaluations in the same manner as in Example 1.

Example 16

A rubber roller 16 was molded in the same manner as in Example 1 except the following. In the material composition of Table 3 in Example 1, the NBR as a raw material rubber was changed to an NBR (trade name: N250SL) and its compounding amount was changed to 90 parts by mass. In addition, the compounding amount of the SBR-1 was changed to 10 parts by mass. The surface hardness of the rubber roller 16 was measured in the same manner as in Example 1.

In addition, a charging roller 16 was obtained through irradiation of an electron beam onto the surface of the rubber roller 16 to cure the surface in the same manner as in Example 1. The charging roller 16 was subjected to surface hardness measurement and image evaluations in the same manner as in Example 1.

Example 17

A rubber roller 17 was molded in the same manner as in Example 16 except that the NBR as a binder polymer was changed to an NBR (trade name: Perbunan 3945). The surface hardness of the rubber roller 17 was measured in the same manner as in Example 1.

In addition, a charging roller 17 was obtained through irradiation of an electron beam onto the surface of the rubber roller 17 to cure the surface in the same manner as in Example 1. The charging roller 17 was subjected to surface hardness measurement and image evaluations in the same manner as in Example 1.

Example 18

A rubber roller 18 was molded in the same manner as in Example 1 except the following. In the material composition of Table 3 in Example 1, the NBR as a raw material rubber was changed to an NBR (trade name: N250SL) and its compounding amount was changed to 20 parts by mass. In addition, the compounding amount of the SBR-1 was changed to 80 parts by mass. The surface hardness of the rubber roller 18 was measured in the same manner as in Example 1.

In addition, a charging roller 18 was obtained through irradiation of an electron beam onto the surface of the rubber roller 18 to cure the surface in the same manner as in Example 1. The charging roller 18 was subjected to surface hardness measurement and image evaluations in the same manner as in Example 1.

Example 19

A rubber roller 19 was produced in the same manner as in Example 18 except that the NBR as a binder polymer was changed to an NBR (trade name: Perbunan 3945). The surface hardness of the rubber roller 19 was measured in the same manner as in Example 1.

In addition, a charging roller 19 was obtained through irradiation of an electron beam onto the surface of the rubber roller 19 to cure the surface in the same manner as in Example 1. The charging roller 19 was subjected to surface hardness measurement and image evaluations in the same manner as in Example 1.

Example 20

A rubber roller 20 was molded in the same manner as in Example 1 except the following. In the material composition of Table 3 in Example 1, the NBR as a raw material rubber was changed to an NBR (trade name: N250SL) and its compounding amount was changed to 10 parts by mass. In addition, the compounding amount of the SBR-1 was changed to 90 parts by mass. The surface hardness of the rubber roller 20 was measured in the same manner as in Example 1.

In addition, a charging roller 20 was obtained through irradiation of an electron beam onto the surface of the rubber roller 20 to cure the surface in the same manner as in Example 1. The charging roller 20 was subjected to surface hardness measurement and image evaluations in the same manner as in Example 1.

Example 21

A rubber roller 21 was produced in the same manner as in Example 20 except that the NBR as a binder polymer was changed to an NBR (trade name: Perbunan 3945). The surface hardness of the rubber roller 21 was measured in the same manner as in Example 1.

In addition, a charging roller 20 was obtained through irradiation of an electron beam onto the surface of the rubber roller 20 eam to cure the surface in the same manner as in Example 1. The charging roller 20 was subjected to surface hardness measurement and image evaluations in the same manner as in Example 1.

Comparative Examples 1 to 4

Rubber rollers 22 to 25 were each produced in the same manner as in Example 1 except that the kind and compounding amount of the NBR in the material composition of Table 3 in Example 1, and the kind and compounding amount of the SBR therein were changed as shown in Table 9. The surface hardnesses of those rubber rollers were measured in the same manner as in Example 1.

In addition, charging rollers 22 to 25 were obtained through irradiation of an electron beam onto the each surface of the rubber rollers 22 to 25 to cure the surface in the same manner as in Example 1. Those charging rollers were subjected to surface hardness measurement and image evaluations in the same manner as in Example 1.

TABLE 9

| Comparative | NBR (part(s) by mass) | | | SBR (part(s) by mass) | | | | |
|---|---|---|---|---|---|---|---|---|
| Example | "N230SV" | "N250SL" | "Perbunan 3945" | SBR-1 | SBR-2 | SBR-3 | SBR-4 | SBR-5 |
| 1 | 50 | — | — | — | — | — | 50 | — |
| 2 | 50 | — | — | — | — | — | — | 50 |
| 3 | — | 50 | — | — | — | — | — | 50 |
| 4 | — | — | 50 | — | — | — | 50 | — |

Comparative Example 5

A rubber roller 26 identical to the rubber roller 2 was produced in the same manner as in Example 2. Image evaluations were performed in the same manner as in Example 1 except that the rubber roller 26 was used as a charging roller 26 without the irradiation of its surface with any electron beam.

Comparative Example 6

A rubber roller 27 was produced in the same manner as in Example 1 except that the compounding amount of the SBR-1 in the composition shown in Table 3 of Example 1 was changed to 0 parts by mass. The surface hardness of the rubber roller 27 was measured in the same manner as in Example 1.

In addition, charging roller 27 was obtained through irradiation of an electron beam onto the surface of the rubber roller 27 to cure the surface in the same manner as in Example 1. The charging roller 27 was subjected to surface hardness measurement and image evaluations in the same manner as in Example 1.

Table 10 shows the surface hardnesses (MD-1 hardnesses and Fischer hardnesses) of the rubber rollers 1 to 21 according to Examples 1 to 21 described above, the surface hardnesses (MD-1 hardnesses and Fischer hardnesses) of the charging rollers 1 to 21 according thereto, and a surface hardness change rate between a rubber roller and the corresponding charging roller, that is, a value (%) obtained by dividing the absolute value of a difference in surface hardness between the rubber roller and the charging roller by the surface hardness of the rubber roller. In addition, Table 11 shows the results of the image evaluations according to the charging rollers 1 to 21.

In addition, Table 12 shows the respective surface hardnesses of the rubber rollers and the charging rollers according to Comparative Examples 1 to 6 described above, and their hardness change rates. In addition, Table 13 shows the results of the image evaluations according to the charging rollers 22 to 27.

TABLE 10

| Example | Rubber roller No. | MD-1 hardness (°) | Fischer hardness ($N/mm^2$) | Charging roller No. | MD-1 hardness (°) | Fischer hardness ($N/mm^2$) | Hardness change rate MD-1 hardness | Hardness change rate Fischer hardness |
|---|---|---|---|---|---|---|---|---|
| 1 | 1 | 72 | 1.8 | 1 | 81 | 11.3 | 13% | 528% |
| 2 | 2 | 72 | 1.2 | 2 | 81 | 9.3 | 13% | 675% |
| 3 | 3 | 73 | 2.1 | 3 | 82 | 14.5 | 12% | 590% |
| 4 | 4 | 61 | 0.7 | 4 | 71 | 8.5 | 16% | 1114% |
| 5 | 5 | 81 | 3.9 | 5 | 91 | 15.5 | 12% | 297% |
| 6 | 6 | 60 | 0.9 | 6 | 70 | 11.8 | 17% | 1211% |
| 7 | 7 | 81 | 3.8 | 7 | 91 | 18.6 | 12% | 389% |
| 8 | 8 | 70 | 1.1 | 8 | 79 | 7.9 | 13% | 618% |
| 9 | 9 | 71 | 1.4 | 9 | 81 | 10.1 | 14% | 621% |
| 10 | 10 | 74 | 1.7 | 10 | 83 | 8.9 | 12% | 424% |
| 11 | 11 | 73 | 1.7 | 11 | 83 | 9.4 | 14% | 453% |
| 12 | 12 | 73 | 1.3 | 12 | 83 | 10.4 | 14% | 700% |
| 13 | 13 | 69 | 1.4 | 13 | 79 | 7.8 | 14% | 457% |
| 14 | 14 | 72 | 1.4 | 14 | 81 | 8.1 | 13% | 479% |

TABLE 10-continued

| Example | Rubber roller No. | MD-1 hardness (°) | Fischer hardness (N/mm$^2$) | Charging roller No. | MD-1 hardness (°) | Fischer hardness (N/mm$^2$) | Hardness change rate MD-1 hardness | Hardness change rate Fischer hardness |
|---|---|---|---|---|---|---|---|---|
| 15 | 15 | 74 | 1.5 | 15 | 84 | 8.6 | 14% | 473% |
| 16 | 16 | 71 | 1.2 | 16 | 81 | 9.1 | 14% | 658% |
| 17 | 17 | 73 | 0.8 | 17 | 83 | 6.9 | 14% | 763% |
| 18 | 18 | 72 | 0.9 | 18 | 83 | 8.3 | 15% | 822% |
| 19 | 19 | 72 | 1.1 | 19 | 82 | 9.9 | 14% | 800% |
| 20 | 20 | 73 | 1.0 | 20 | 82 | 9.7 | 12% | 870% |
| 21 | 21 | 73 | 1.1 | 21 | 82 | 10.1 | 12% | 818% |

TABLE 11

| Example | Charging roller No. | Image evaluation: Evaluation 1 | Image evaluation: Evaluation 2 | Image evaluation: Evaluation 3 |
|---|---|---|---|---|
| 1 | 1 | A | A | A |
| 2 | 2 | A | A | A |
| 3 | 3 | A | A | A |
| 4 | 4 | B | B | B |
| 5 | 5 | A | A | A |
| 6 | 6 | A | A | B |
| 7 | 7 | A | A | A |
| 8 | 8 | B | A | A |
| 9 | 9 | A | A | A |
| 10 | 10 | A | A | A |
| 11 | 11 | A | A | A |
| 12 | 12 | A | A | A |
| 13 | 13 | B | A | B |
| 14 | 14 | A | A | B |
| 15 | 15 | A | A | A |
| 16 | 16 | B | B | A |
| 17 | 17 | B | B | B |
| 18 | 18 | A | A | A |
| 19 | 19 | A | A | A |
| 20 | 20 | A | B | A |
| 21 | 21 | A | B | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-252920 filed on Nov. 11, 2010, which is hereby incorporated by reference herein.

What is claimed is:

1. A charging member comprising:

an electroconductive support; and an electroconductive elastic layer, wherein:

the elastic layer is formed through irradiation of an electron beam onto a surface of a rubber layer consisting of a cross-linked product of a rubber mixture comprising an acrylonitrile-butadiene rubber and a styrene-butadiene rubber;

the styrene-butadiene rubber has a 1,2-vinyl bond represented by the following formula (1), and

TABLE 12

| Comparative Example | Rubber roller No. | MD-1 hardness (°) | Fischer hardness (N/mm$^2$) | Charging roller No. | MD-1 hardness | Fischer hardness (N/mm$^2$) | Hardness change rate MD-1 hardness | Hardness change rate Fischer hardness |
|---|---|---|---|---|---|---|---|---|
| 1 | 22 | 71 | 0.8 | 22 | 81 | 20.9 | 14% | 2513% |
| 2 | 23 | 73 | 0.6 | 23 | 80 | 2.2 | 10% | 267% |
| 3 | 24 | 70 | 0.6 | 24 | 78 | 2.3 | 11% | 283% |
| 4 | 25 | 74 | 0.8 | 25 | 85 | 22.6 | 15% | 2725% |
| 5 | 26 | 72 | 1.2 | 26 | 72 | 1.2 | 0% | 0% |
| 6 | 27 | 73 | 1.0 | 27 | 82 | 8.4 | 12% | 740% |

TABLE 13

| Comparative Example | Charging roller No. | Image evaluation: Evaluation 1 | Image evaluation: Evaluation 2 | Image evaluation: Evaluation 3 |
|---|---|---|---|---|
| 1 | 22 | C | C | B |
| 2 | 23 | D | D | C |
| 3 | 24 | D | D | C |
| 4 | 25 | C | C | B |
| 5 | 26 | D | D | D |
| 6 | 27 | D | D | B |

Preferred embodiments of the present invention will now be described in detail in accordance with the accompanying drawings.

at least one bond selected from a cis-1,4 bond represented by the following formula (2) and a trans-1,4 bond represented by the following formula (3); and a ratio of a sum of the numbers of moles of the cis-1,4 bond and the trans-1,4 bond to a total number of moles of the 1,2-vinyl bond, the cis-1,4 bond, and the trans-1,4 bond is 31 mol % or more and 61 mol % or less:

Formula (1)

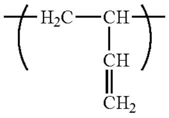

-continued
Formula (2)
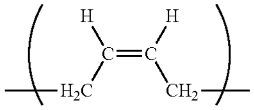
Formula (3)
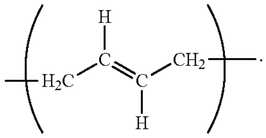
2. An electrophotographic apparatus, comprising:
the charging member according to claim 1; and
an electrophotographic photosensitive member disposed to be chargeable by the charging member.
* * * * *